E. V. MYERS.
PUMP COUPLING OR THE LIKE.
APPLICATION FILED MAR. 21, 1916.

1,297,719.

Patented Mar. 18, 1919.

WITNESSES:
René Brisson
J. J. Wallace

INVENTOR:
Eugene V. Myers
By Attorneys,
Fraser Turk & Myers

UNITED STATES PATENT OFFICE.

EUGENE V. MYERS, OF EAST ORANGE, NEW JERSEY, ASSIGNOR TO A. SCHRADER'S SON, INC., OF BROOKLYN, NEW YORK, A CORPORATION OF NEW YORK.

PUMP-COUPLING OR THE LIKE.

1,297,719.  Specification of Letters Patent.  Patented Mar. 18, 1919.

Application filed March 21, 1916. Serial No. 85,632.

*To all whom it may concern:*

Be it known that I, EUGENE V. MYERS, a citizen of the United States of America, residing in East Orange, in the county of Essex and State of New Jersey, have invented certain new and useful Improvements in Pump-Couplings or the like, of which the following is a specification.

This invention relates to pump couplings or other devices, wherein it is desired to make a joint with the top of a structure such as a tire valve casing.

There have been numerous constructions heretofore proposed for pump couplings, for instance, which are of what is known as the quick detachable type, that is to say, couplings which could be attached to a threaded part, such as a valve casing, without the necessity of screwing it the entire length of the thread. Such constructions have been subject, however, to disadvantages which have prevented their general use.

According to the present invention I provide a structure which can be attached to a valve casing, in such manner as to make a leak-tight joint, with great celerity and ease of operation. The structure is also applicable to such purposes as valve caps or other similar devices wherein a tight joint is to be made between a valve or the like and the cap.

The invention comprises a device having a series of movable arms screw-threaded to engage the valve casing or other part, and a wedging means for moving said arms inwardly, the wedging means being stationary or substantially so, and the arms being moved by the application of force to the part which carries them.

Referring to the drawings, which illustrate several forms of the invention,—

Figure 1:
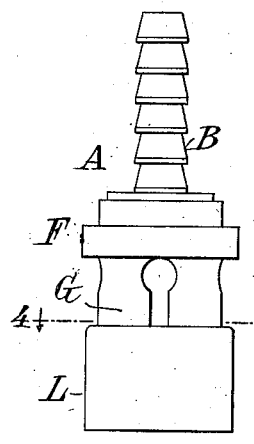
Figure 1 is an elevation of the preferred form.

In the drawing I have shown the invention as applied to a pump coupling adapted to be attached, for instance, to the tube of a pump or air tank.

Figure 2:
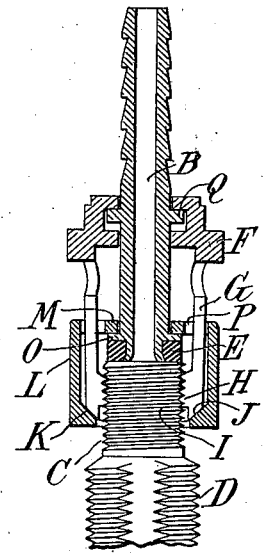
Fig. 2 is a diametrical section of Fig. 1, shown as applied to a valve casing.
Figure 3:
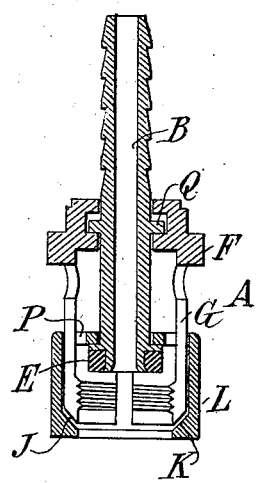
Fig. 3 is a similar section with the parts in open position.
Figure 4:
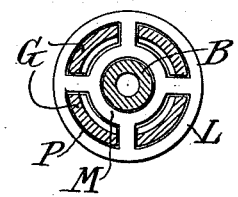
Fig. 4 is a cross section on the line 4—4 in Fig. 1.

Referring first to Figs. 1 to 3, let A indicate the device as a whole, which is provided with a tubular member B adapted for connection with a rubber tube leading from the pump. In the simplest form of construction the tube B is adapted to fit against the nipple C of a tire casing D, although it may engage any other part of the tire casing where a leak-tight joint may be made. Such joint is best made by a packing E which in the construction shown is carried at the inner end of the tube B and fits against the extreme end of the nipple. F indicates a member having a series of movable arms G which are shown as four in number, and which in the construction illustrated are in the nature of spring arms, although any other suitable construction of movable arms may be provided. Each of the arms G is provided at its lower end with a screw-threaded portion H which is designed to engage the screw-threads of the nipple C. The screw-threaded portions of the four arms form a substantially complete circle. At the lower parts of the arms they are preferably formed with a beveled surface J, which engages a similar surface K formed on the wedging member L. The latter is connected with the pump tube B in any suitable manner as by a flange M formed on the wedging member L which bears against a flange O formed on the pump tube. The wedging member L is provided with a series of slots P, through which the spring arms G are introduced in assembling the parts.

The operation of the device is as follows: Normally the parts are in the position of Fig. 3 with the spring arms G in their outward position. The internal diameter of the device is then sufficient to slip it over the nipple C. The arm member F is then pressed downwardly with the effect that the spring arms are wedged inwardly and engage the threads I, whereupon a fraction of a turn applies the coupling to the valve, the packing E being compressed against the end of the valve casing with sufficient force to make a thoroughly leak-tight joint. It will be observed that when the device is initially applied, the packing E has already made a seat on the top of the valve nipple and any downward pressure then applied to the arm member F tends to move the packing into closer contact with the valve nipple. After the threads engage and the part F is rotated slightly, its downward movement acts to press the wedging member L downwardly, this downward movement of the wedging member being instantly transmitted to the tube B and its packing E.

It will also be observed that the present invention is to be distinguished from those devices in which the wedging member is pressed downwardly to move the arms inwardly, since in the present construction it is the member which carries the arms which is pressed down to manipulate the device, and the wedging member transmits its movement to the tube B or other part to be compressed against the casing.

It is preferable to form a flange Q which is adapted to contact with the arm member F to prevent the wedging member L from dropping off the spring arms. This flange plays no part in the actual work of coupling.

Figure 5:
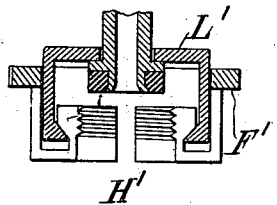
Fig. 5 is a diametrical section of a modification.

In Fig. 5 I have shown a construction in which the spring arms instead of passing through the wedge member are brought around the outside of the latter and up into the interior of the wedge member. In this construction the wedge member is engaged at L' and the member carrying the arms at F'. To assemble the portions H' will be bent inwardly sufficient to pass into the bottom opening of the wedge member, and then expanded outwardly to the position shown.

Figure 6:
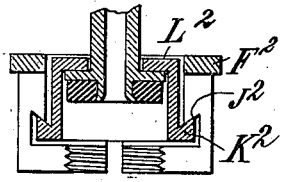
Fig. 6 is a similar section of another modification.

In Fig. 6 the wedge member $L^2$ is formed with an external bevel $K^2$ and the member $F^2$ which carries the spring arms is external to the wedge member and is formed with an internal bevel $J^2$.

The operation of the constructions of Figs. 5 and 6 is similar to that described with reference to Figs. 1 to 3, that is to say, the device is placed over the valve, and the arm member is pressed downwardly until the threads engage, and a short turn is then given to the wedge member.

It will be observed that in the constructions of Figs. 1 to 6 the wedging member is hung upon the part B or other part to be compressed against the valve, so that as the member which carries the spring arms moves downwardly it acts against the part to be compressed.

Figure 7:
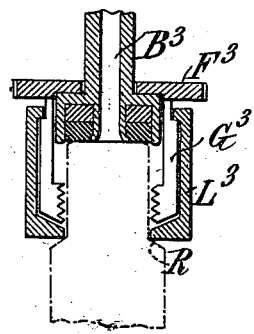
Fig. 7 is a similar section of a third modification.

In Fig. 7 is illustrated a construction which may be used in connection with valves having a shoulder R. In this construction the wedge member $L^3$ is external and the arms $G^3$ are internal. The member $F^3$ which carries the arms in this construction is connected to the tube $B^3$, so that any tightening by the packing is accomplished by the downward movement of the arm member, and the wedge member merely rests against the shoulder R, and acts as a fixed wedging surface for moving the arm member inwardly. This construction is available in some cases, but it requires much greater precision of manufacture than those hereinbefore referred to, due to the fact that the arm member is limited in its capacity for downward movement, and the degree of movement which can hence be imparted to the tube $B^3$ is slight. If the threads to which the part is applied are sufficiently deep, this capacity for downward movement after the coupling threads engage can be increased by making the wedging surface more tapering.

Figure 8:
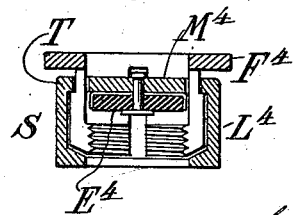
Fig. 8 is a view of the invention as applied to a cap.

In Fig. 8 I have illustrated the invention as applied to a cap, the device being constructed according to Figs. 1 to 3, although it will be understood that the other modifications are equally applicable. If it be assumed that the bore of the tube B be omitted, it will be observed that any of the constructions shown will make an effective leak-tight cap. In Fig. 8 the wedge member is indicated at $L^4$ and the arm member at $F^4$. The packing is indicated at $E^4$ and may be fixed to the part $M^4$, which in this case may be formed integrally with the wedge member $L^4$, and may extend across the middle of the structure.

In each of the constructions shown in Figs. 1 to 7 it will be observed that the coupling member proper is swiveled to the part which carries the packing. This is not necessary, although it is desirable in order that the packing may be relieved from the possibility of distortion as the coupling is applied. So also in Fig. 8 the packing may be carried upon a carrier S which is provided with a stud T swiveled to the part $M^4$, so that the cap can be rotated without rotating the packing.

It is, of course, not necessary that both the arms and the wedge member be formed with tapering surfaces, since such surface can be omitted from one or the other. Throughout the claims I have used the term "wedge member" to indicate the part which moves the arms into engagement with the thread, irrespective of whether the taper is formed on this part or not.

It will be observed that while I have shown and described several forms of the invention, that I do not wish to be limited thereto, since various changes may be made therein without departing from the spirit of the invention. The invention is applicable to other devices than coupling and caps.

What I claim is:—

1. A device of the character described comprising a part to be pressed against a threaded member to make a tight joint therewith, a wedge member, and an arm member having a plurality of movable threaded arms, said wedge member being the stationary member and said arm member being the movable member, and the threaded ends of said arms being adapted to coact with the wedge member to engage said threaded member when the arm member is moved relatively to the wedge member.

2. A device of the character described comprising a part carrying the packing and adapted to be pressed against a threaded member to make a tight joint therewith, a wedge member, and an arm member having a plurality of movable threaded arms, said wedge member being the stationary member and said arm member being the movable member, and the threaded ends of said arms being adapted to coact with the wedge member to engage said threaded member when the arm member is moved relatively to the wedge member.

3. A device of the character described comprising a tube having a packing adapted to be pressed against the end of a valve casing to make a tight joint therewith, a wedge member, and an arm member having a plurality of movable threaded arms, said wedge member being the stationary member and said arm member being the movable member, and the threaded ends of said arms being adapted to coact with the wedge member to engage said valve casing when the arm member is moved relatively to the wedge member.

4. A device of the character described comprising a part to be pressed against a threaded member to make a tight joint therewith, a wedge member connected to said part, and a rotary arm member having a plurality of movable screw threaded arms the threaded ends of which are adapted to coact with the wedge member to engage said threaded part when the arm member is moved relatively to the wedge member.

5. A device of the character described comprising a part to be pressed against a threaded member, a wedge member connected with said part to effect the pressing action, and means for forcing said wedge member downwardly along said threaded member.

6. A pump coupling comprising a tubular member, a wedge member connected with said tubular member to press it downwardly, and means for forcing down said wedge member.

7. A device of the character described comprising a part to be pressed against a threaded member, a wedge member connected with said part, and means for forcing said wedge member downwardly along said threaded member, said means comprising a plurality of movable threaded arms having threaded portions adapted to engage the threaded member, and said arms being adapted to coact with the wedge member to engage said threaded member when said arms are moved relatively to the wedge member.

8. A device of the character described comprising a part to be pressed against a threaded member, a wedge connected with said part to effect the pressing action, and an arm member having a plurality of spring arms threaded to engage said threaded member, and said spring arms being adapted to engage said wedge when said arm member is moved lengthwise, and said arm member being adapted to be moved lengthwise to cause the arms to contract to engage the coupling with the threaded member.

9. A device of the character described comprising a part to be pressed against a threaded member, a wedge connected with said part to effect the pressing action, and an arm member having a plurality of spring arms threaded to engage said threaded member, and said spring arms having their threaded portions lying within said wedge, and being adapted to engage said wedge when said arm member is moved lengthwise, and said arm member being adapted to be moved lengthwise to cause the arms to contract to engage the coupling with the threaded member.

10. A device of the character described comprising a circular wedging member, a pump tube engaged by said wedging member and adapted to be moved by the latter, and an arm member having movable threaded arms passing through the top of said wedging member, said arms being adapted to coact with said wedging member to engage a valve casing when said arm member is forced downwardly.

11. A device of the character described comprising a pump tube having a packing, a circular wedging member engaging said tube and adapted to move the same inwardly, and said wedging member having an internal tapered face, an arm member having a plurality of movable threaded arms passing through openings in the top of said wedging member and having threaded portions and said movable arms being adapted to coact with said wedging face to engage the threaded part of a valve casing when said arm member is moved downwardly, and said arms being adapted to move said wedging member downwardly when the arm member is screwed on said casing.

12. A device of the character described comprising a part to be pressed against the top of a threaded member, a wedging member directly connected with said part, so that as the wedging member is pressed downwardly it carries said part with it, and means for pressing said wedging member downwardly, said means comprising an arm member having a series of movable threaded arms, said arms coacting with said wedging member so that as said arm member is pressed downwardly said arms are caused to move inwardly and engage said threaded member and said arms being adapted after such engagement to be rotated in engagement with a threaded member to screw the device farther on said threaded member.

In witness whereof, I have hereunto signed my name in the presence of two subscribing witnesses.

EUGENE V. MYERS.

Witnesses:
THOMAS F. WALLACE,
GRACE GUNDERMAN.